United States Patent [19]

Roberts et al.

[11] 3,956,421

[45] May 11, 1976

[54] POLAR THERMOPLASTIC ADDITIVE FOR MOLDING COMPOUNDS AND MOLDING COMPOUND CONTAINING SAME

[75] Inventors: Michael G. Roberts, Heath; Kenneth P. Chase, Newark, both of Ohio

[73] Assignee: Owens-Corning Fiberglas Corporation, Toledo, Ohio

[22] Filed: Dec. 12, 1974

[21] Appl. No.: 532,113

[52] U.S. Cl. ............... 260/862; 260/33.6 UA; 260/40 R; 260/855; 526/72; 526/79; 526/260; 526/264; 526/277; 526/310; 526/329; 526/347

[51] Int. Cl.² .............. C08L 67/06; B01F 7/00; B01F 15/02

[58] Field of Search ............... 260/33.6 UA

[56] References Cited
UNITED STATES PATENTS

| | | | |
|---|---|---|---|
| 2,568,331 | 9/1951 | Frilette | 260/40 R |
| 3,227,665 | 1/1966 | Fourcade | 260/40 R X |
| 3,503,921 | 3/1970 | Souza, Jr. et al. | 260/862 |
| 3,574,788 | 4/1971 | Baum | 260/862 |
| 3,729,528 | 4/1973 | Werner et al. | 260/862 |
| 3,772,241 | 11/1973 | Kroeker | 260/40 R |
| 3,810,863 | 5/1974 | Hatton et al. | 260/40 R |
| 3,830,772 | 8/1974 | Busch et al. | 260/40 R |
| 3,844,995 | 10/1974 | Kloker et al. | 260/40 R |
| 3,852,376 | 12/1974 | Bando et al. | 260/40 R |
| R25,395 | 6/1963 | Mallison | 260/862 X |

*Primary Examiner*—Joseph L. Schofer
*Assistant Examiner*—Herbert J. Lilling
*Attorney, Agent, or Firm*—John W. Overman; Philip R. Cloutier

[57] ABSTRACT

The disclosure teaches the gelling and thickening of matrix forming resin systems by ion-dipole bonds. Suitable ions are introduced into the resin matrix as alkaline oxides or hydroxides. Thermoplastic polymers containing polar groups are used as additives for the thermosetting resins to offset shrink of the thermosetting resins during their crosslinking and curing in the molding operation. In the molded thermoset state of the resin materials, the polar groups provide sites for the improved bonding of paints, as for example, gel coats. The invention has particular advantages in polyester thermosetting resin systems and in the thermoplastic additives that are used therewith. Polar monomers copolymerized with styrene are the preferred thermoplastic additives.

7 Claims, No Drawings

POLAR THERMOPLASTIC ADDITIVE FOR MOLDING COMPOUNDS AND MOLDING COMPOUND CONTAINING SAME

BACKGROUND OF THE INVENTION

The present invention relates to molding resin systems which are thickened at room temperature by the reaction of an alkaline earth oxide or hydroxide with one or more resins of the system. In the case of polyester resins, for example, the carboxyl groups of the crosslinkable polyester resin prepolymer react with the alkaline earth oxide to increase the molecular weight and change the prepolymer from a viscous syrup to a self-supporting solid state. Molding compounds are made by mixing the crosslinking prepolymer resins with solvents, an alkaline earth oxide or hydroxide, fibers, and particular fillers; and during the crosslinking reaction of the prepolymer resin, a shrinkage of the resin occurs leaving an outline of the fibers and fillers on the surface of the molded part. The raised areas on the surface are commonly referred to as "fiber prominence". A fairly recent development in the polyester molding art has been the reduction of "fiber prominence" by incorporating approximately 25% of a thermoplastic polymer in the thermosetting resin prepolymer syrup. A separation of the thermoplastic additive occurs during the condensation of the thermosetting resin prepolymer. This separation of the thermoplastic additive results in an increase in the volume occupied by the thermoplastic additive which largely offsets the shrinkage of the thermosetting prepolymer during its condensation.

The thermoplastic additives that are dissolved in the prepolymer syrup can exude to the surface of the molding compounds upon standing. In a more recent development, however, the art has learned to prevent the exuding of the thermoplastic additive to the surface by reacting from approximately 1% to approximately 5% of an unsaturated acid with the unsaturated monomers that are used to make the thermoplastic additive. The acid groups that are thereby provided as part of the thermoplastic additive react with the alkaline earth ions in the molding compound to prevent the separation of the thermoplastic additive from the matrix. The amount of the unsaturated acid that is used must be closely controlled since a mere 1% greatly increases the viscosity of the molding compound which then requires a correspondingly large increase in the molding pressures that are used to shape and cure the compound into a molded part. When more than about 4% or 5% of the unsaturated acid is used to make the thermoplastic additive, the thermoplastic additive then tends to gel and become incompatible with the thermosetting resin prepolymers, and separates therefrom during standing at room temperature. While the art has now progressed to the point where the "fiber prominence" has been largely overcome, the surface of the prior art molded parts are generally unreceptive to paint, even though the surfaces are cleaned with solvents.

An object of the present invention is the provision of new and improved crosslinkable resin systems having improved thickening properties before molding, and which have better paint receptivity after molding.

A further object of the present invention is the provision of new and improved thermosetting resin systems having as good handleability at room temperature as acid thickened systems, but having better flowability at molding temperatures and pressures.

A still further object of the present invention is the provision of new and improved thermoplastic additives for thermosetting resin systems, the additives of which provide improved gelation and thickening of the premolded resins and better paint receptivity for the molded thermoset resins.

DESCRIPTION OF THE PREFERRED EMBODIMENTS

According to the present invention it has been discovered that thermosetting prepolymers as well as additives therefor can be thickened by means of an ion-dipole bonding phenomenon instead of by means of the acid-base ionic reaction used heretofore. It has further been discovered that the ion-dipole phenomenon permits molding compounds to be made which although amply solid at room temperature for handling purposes have greater flowability at molding temperatures such that better mold distribution is obtained at lower molding pressures. In addition it has been found that parts made of the molding compounds containing the thermoplastic additives of the present invention have better paint receptivity than do the parts made of prior art molding compounds having acid functionality.

In general, any polar ethylenically unsaturated monomer which can form strong ion-dipole bonds to an alkaline earth cation can be used as a co-monomer in producing a thermoplastic additive. A partial list of such polar groups will include nitrile groups, lactam groups, amine groups, alcohol groups, and the diesters of phosphorus acid. During polymerization the polar groups become pendant on the backbone of the polymer chain.

These pendant polar groups are thus exposed for ion-dipole bonding during the thickening process to alkaline earth cations, and when on the surface of the molded parts, are available for bonding to paint molecules. A greater amount of these pendant polar groups can be incorporated in thermoplastic additives, without making the additives incompatible with thermosetting prepolymers, than can be incorporated using carboxyl groups.

In general, the thermoplastic additives will comprise from approximately 1% to approximately 30% by weight of the polar monomer, preferably between 7% and 20% by weight, and most preferably from 10% to 15% by weight of the polar monomer. The thermoplastic additive will in turn comprise from approximately 1% to approximately 25% by weight of the combined weight of thermoplastic and thermosetting polymers used in the molding compound.

EXAMPLE 1

A thermoplastic additive material for a low shrink thermosetting polyester was prepared according to the present invention using the following procedure.

A reactor that was equipped with a thermometer, 4-bladed paddle stirrer, nitrogen sparge tube, addition funnel, and an internal cooling coil was charged with 1,736.6 parts of styrene, and 40.4 parts of 2-vinyl pyridine. The reactor was sparged with nitrogen for 30 minutes after which the temperature was raised to 70°C and was held at this temperature. Thereafter, 3.8 parts of azo bis (isobutyronitrile) was mixed with 100 parts of styrene and the mixture was added to the addition funnel. Forty percent of the catalyst solution was added to the reactor and an exotherm occurred after about 5 minutes. Thereafter cold tap water was flowed through the cooling coil and the reactor was heated as necessary to maintain 70°C plus or minus 0.5°C. After 2 hours of reaction, 30% more of the catalyst solution was added; and after an additional 2 hours of reaction, the remaining catalyst solution was added. The reaction continued for another 2 hours at which time the solids level was 37.2 %. At this time 0.5 parts of an inhibitor (toluhydroquinone) was added to short stop the reaction and the batch was discharged. Sufficient styrene monomer was added to the batch to thin the batch to 33.3% solids. The styrene-vinyl pyridine copolymer so produced had a dispersity of 2.9 and an average molecular weight of 175,000.

A polyester was prepared in another reactor from the following materials in parts by weight:

| Materials | Parts By Weight |
| --- | --- |
| Propylene glycol | 578.2 |
| Maleic anhydride | 674.4 |
| Toluhydroquinone (25% solution in styrene) | 4.8 |

The polyester was made by charging all the propylene glycol, one third of the maleic anhydride and 1.6 grams of the toluhydroquinone into the reactor using a continuous nitrogen sparge. The temperature was raised to 190°F; and after about 4 hours, the acid number was 35. Thereafter the remainder of the maleic anhydride was added at the rate of 100 to 150 parts per minute to control the temperature at 300°F. Thereafter the temperature of the ingredients was held at 310°F to 320°F for 60 minutes, following which the temperature was increased to 400°F. The material had an acid number of 29 to 32 and a sample when cut 2 to 1 in styrene had a Saybolt viscosity of 21 to 25 seconds at 350°F. Thereafter the contents were cooled to 340°F. The polyester prepolymer when cut with styrene in a 90 to 10 ratio was stable at 120°C for 30 minutes before gelling.

In another tank 486.4 parts of styrene, 2.0 parts of MEHQ (methyl ether of hydroquinone) was added and the mixture was held at a temperature between 130°F to 145°F. Thereafter 1,138 parts of the polyester resin prepolymer produced as above described and at a temperature of 330°F to 355°F was added with agitation to provide a thinned polyester syrup which was then cooled to a temperature of 180°F. The viscosity of the thinned polyester syrup was 1,500 to 2,000 centipoise as determined by a Brookfield LVT viscosimeter, and the syrup had a water content of 0.08 and a monomer content of 33.3% by weight.

A bulk molding compound was made from the following materials in parts by weight:

| Materials | Parts By Weight |
| --- | --- |
| Polyester resin syrup as above described (67% solids) | 840 |
| Thermoplastic syrup as above described (33% solids) | 560 |
| Camelwite | 2,073 |
| Zinc stearate | 52 |
| Tertiary butyl perbenzoate catalyst | 14 |
| Mg(OH)$_2$ | 42 |
| One-quarter inch long chopped glass fibers | 1,541 |
| of Ward et al application Serial No. 336,390 | |

All of the above ingredients except the Mg(OH)$_2$ and the chopped fibers were blended to a smooth consistency by a Cowles mixer. The mixture was transferred to a Baker-Perkins sigma blade type mixer, and the Mg(OH)$_2$ thickening agent was added and the mix continued for another 2.5 minutes. The bulk molding compound was discharged from the mixer and was wrapped in Cellophane and allowed to age for 2 days at room temperature. The viscosity at this time, as determined by a Brookfield HBT viscosimeter, was 40 mm. No thermoplastic exuded from the surface, and when the Cellophane was removed, no thermoplastic materials adhered thereto in what is known as "cobwebbing".

A test specimen was made by weighing out a sufficient amount of the premix to fill a 12 × 18 inch flat bottom mold to a depth of 0.100 inch, and the cover die was brought down upon the compound with sufficient force to provide a pressure of 1,000 lbs. per square inch on the compound. The premix was cured under this compression for 3 minutes at a temperature of 280°F to 300°F following which the molded sheet was removed and cooled. The surface of the molded specimen was smooth with no evidence of fiber imprint. The specimen had evidence of good flowability in the mold as evidence by a large amount of thin flash.

One half of the test specimen was boiled in water for 24 hours after which it had absorbed 0.200% moisture; and after 100 hours of boiling, it had absorbed 1.4% moisture. There were fewer numbers of blisters on the surface after boiling 100 hours than have prior art materials, and there was no fiber prominence, cracks, or loss of gloss.

The other half of the test specimen was coated with a commercial sanitary polyester gel coat. The specimen was coated with a 1/32 inch thick layer of the above-described gel coat which was then hardened at room temperature for 24 hours. Thereafter the coating was cut through with a razor blade by cuts intersecting at 45°, and a 3-M Cellophane tape was finger smoothed onto the gel coat surface over the intersecting cuts. The free end of the Cellophane tape was quickly pulled straight up, and the specimen was observed for removal of the gel coat adjacent the edge of the cuts. This Cellophane tape test is a standard of the Assignee of the present invention, and the percentage of gel coat remaining along the cut edge is rated from 0 to 10 with each number representing 10% of undamaged edge. The specimen after 24 hours of aging in a humidity chest at 100°F had a rate of 9. The specimen after 96 hours in the humidity chest at 100°F had a rating of 8. After 240 hours immersion in water at 100°F the specimen gave a rating of 8.

By way of control, and not according to the invention, the process above described was repeated excepting that the thermoplastic polystyrene polymer used was the styrene-acrylic acid copolymer of Example 1 of our application Ser. No. 457,948. This control material gave less flash in the mold and some evidence of thermoplastic seepage beneath the Cellophane sheet. The gel coated specimen had 0.279% absorption after the 24-hour boil test; and after 100 hours of boiling had 1.947% absorption, and a blister rating of 5.0. The portion subjected to the scratch test had a tape test rating of slightly less than 8 after aging in the humidity chest for 96 hours.

EXAMPLE 2

The procedure of Example 1 was repeated excepting that 4-vinyl pyridine was substituted for the 2-vinyl pyridine, and the test specimen prepared had substantially the same properties as did that of Example 1.

EXAMPLE 3

The process of Example 1 was repeated excepting that 18 parts of acrylonitrile was substituted for the vinyl pyridine to give a 97/3 styrene/acrylonitrile copolymer. The bulk molding compound after 1 hour of aging had a viscosity of 560,000 centipoise, after 2 hours had a viscosity of 1.4 million centipoise, after 19 hours of aging had a viscosity of 5.6 million centipoise, and after 4 days had a viscosity of 28.4 million centipoise. Approximately 30 million centipoise viscosity is an acceptable consistency for a molding compound, so that the copolymer when aged for slightly more than 4 days has an acceptable consistency. This material also gives substantially the same low water absorption rate, paint adhesion, lack of seepage, and flowability in the mold as does the material of Example 1.

EXAMPLE 4

The process of Example 3 is repeated excepting that 60 parts of acrylonitrile was used to give a 90/10 styrene/acrylonitrile copolymer. This material had a viscosity after 1 hour of 680,000 centipoise, after 2 hours had a viscosity of 1.5 million centipoise, after 19 hours had a viscosity of 9.6 million centipoise, and after 4 days had a viscosity of 25.2 million centipoise. The material otherwise had substantially the same other properties as did the material of Example 3.

EXAMPLE 5

The process of Example 1 was repeated excepting that N,N dimethylamino ethyl acrylate was substituted for the vinyl pyridine. The test specimen so produced had substantially the same good properties as did the test specimen of Example 1.

EXAMPLE 6

The process of Example 1 was repeated excepting that 60 parts of vinyl pyrollidone was substituted for the vinyl pyridine of Example 1. The test specimen so produced had substantially the same good properties as did the test specimen of Example 1.

EXAMPLE 7

The process of Example 1 was repeated excepting that 40 parts of methacrylonitrile was substituted for the vinyl pyridine of Example 1. The test specimen so produced had substantially the same properties as that of Example 1.

EXAMPLE 8

A 97/3 styrene/2-hydroxy ethyl acrylate copolymer was made according to the procedure of Example 1 using the following materials in parts by weight:

| Materials | Parts By Weight |
|---|---|
| Styrene | 7,410 |
| 2-hydroxy ethyl acrylate (HEA) | 90 |
| Azo bis (isobutyronitrile) | 15 |

The reactor was initially charged with all of the HEA, and 7,000 parts of the styrene. The remaining 410 parts of the styrene were used to dissolve the catalyst. After the reaction was complete, the product had a solids content of 40%. The bulk molding compound had a viscosity of 600,000 centipoise after one hour, 1.4 million centipoise after 2 hours, 5.6 million centipoise after 19 hours, and 29.2 million centipoise after 4 days. It had 1.94% moisture pickup after boiling for 24 hours, and 1.355% after boiling for 100 hours. The test specimen so produced had substantially the same good properties as did that of Example 1.

EXAMPLE 9

The process of Example 8 was repeated to give a 75/25 styrene/hydroxy ethyl acrylate copolymer using the following materials in parts by weight:

| Materials | Parts By Weight |
|---|---|
| Styrene | 6,800 |
| 2-hydroxy ethyl acrylate | 700 |
| Catalyst Azo bis (isobutyronitrile) | 15 |

The molding compound produced exhibited no thermoplastic seepage. After 1 hour the compound had a viscosity of 600,000 centipoise and after 4 days it had a viscosity of 35 million centipoise. The test specimen so produced had substantially the same good properties as did that of Example 1.

EXAMPLE 10

The process of Example 8 was repeated excepting that hydroxypropyl acrylate was substituted for the hydroxyethyl acrylate. The material so produced had substantially the same properties as did that of Example 8.

EXAMPLE 11

The process of Example 8 was repeated excepting that hydroxypropyl methacrylate was substituted for the hydroxyethyl acrylate. The material so produced had substantially the same properties as did that of Example 8.

EXAMPLE 12

The process of Example 1 was repeated excepting that 42.5 parts of diethyl vinyl phosphonate was substituted for the vinyl pyridine. The material so produced had substantially the same properties as did that of Example 1.

The process of Example 1 was repeated excepting that the following materials were substituted for the vinyl pyridine:

| Example 13 | Example 14 | Example 15 | Example 16 |
|---|---|---|---|
| a-Acetoxy-acrylonitrile | N vinyl 6 hexanolactam | p-cyanostyrene | Cyanoethyl acrylate |

All the specimens so produced had substantially the same good results as did that of Example 1.

The process of Example 1 was repeated excepting that the following materials were substituted for the vinyl pyridine:

| Example 17 | Example 18 | Example 19 |
|---|---|---|
| Dimethylaminoethyl methacrylate | p-dimethylamino styrene | 2 N,N-dimethyl amino-4-vinyl pyridine |

The materials so produced had substantially the same good properties as did that of Example 1.

EXAMPLE 20

Sheet molding compounds are made of the following materials according to the procedure given in the U.S. Davis, Wood and Miller Pat. No. 3,615,979:

| Materials | Desirable % By Weight | Preferred % By Weight |
|---|---|---|
| Linear thermoplastic resin of low dispersity and average molecular weight | 1–20 | |
| Polystyrene of Example 1 | | 4.0 |
| Matrix forming resin having crosslinkable olefinic double bonds | 20–90 | |
| Polyester of Example 1 | | 24.0 |
| Mutual solvent | 5–40 | |
| Styrene | | 20.0 |
| Catalyst for crosslinking double bonds | 0.001–5 | |
| Dicumyl peroxide | | 0.85 |
| 2-5-dimethyl hexyl-2,5 di(peroxybenzoate) | | 0.09 |
| Mold release agent | 0–5 | |
| Zinc stearate | | 1.71 |
| Gelling agent (Alkaline Earth Metal Oxide) | 0–10 | |
| Ca(OH)$_2$ | | 1.28 |
| Fillers and/or fibers | 0–75 | |
| CaCO$_3$ | | 40.0 |
| Chopped glass fibers | | 8.07 |

The sheet molding compound made using the preferred percentage by weight of materials given above has very good properties including high strength and there are substantially no fiber imprints in the surface of the molded article. Sheet molding compounds can be made using the desirable percentages by weight of ingredients given above. The mold release agents, gelling agents, and fillers are not essential, but are usually used in sheet molding compounds for the well known functions which they perform. The fillers cheapen the product and provide coloration, and the fibers strengthen the product. A combination of fillers and fibers is usually used to provide optimum strength at a minimum cost. The upper percentage of the ranges given above for the crosslinking resin is the maximum percentage used in resin mixes that are devoid of fillers and fibers. The lowest percentage of the range given is that used when fillers and/or fibers are utilized. The same is true for the percentage ranges given for the thermoplastic resin, and the mutual solvent.

The degree of paint adhesion which the molding compounds of the present invention have is generally proportional to the amount of the polar materials which are used. The polar monomers used in the present invention cost more than the monomers used to form the polyester matrix resins and an acceptable level of paint receptivity or adhesion is accomplished when approximately 10% of the polar monomer is used to form the thermoplastic additive, and approximately 25% of the polar additive is used in the total resin system. Such is true, for example, when an isophthalic gel coat is used to coat unpainted sanitary ware. Resin systems on the other hand which contain only approximately 10% of the polar thermoplastic additives of the present invention will not develop a viscosity of 30 million centipoise in 7 days, and therefore the inclusion of a small amount of an organic acid can be used to cause an ultimate thickening with the alkaline earth oxide or hydroxide of at least 30 million centipoise without substantially increasing the thickness of the resin syrups before mixing with the alkaline earth material.

EXAMPLE 21

The procedure of Example 1 is repeated using the following materials in percent by weight for producing the thermoplastic additive:

| Materials | % By Weight |
|---|---|
| Styrene | 900 |
| Hydroxyethyl acrylate | 100 |
| Acrylic acid | 6.5 |
| Benzoyl peroxide | 1.5 |

These materials produce a polar thermoplastic terpolymer of styrene, hydroxyethyl acrylate, and acrylic acid having a practical degree of thickening before blending with the dry materials, as well as a sufficiently thickened final state to provide a workable, handleable material for use as a sheet molding compound.

The following table is given as a quick comparison of the two stages of thickening that is had with various percentages of various polar thermoplastic materials:

| | CENTIPOISE | | |
|---|---|---|---|
| Polymer | 20 Min. Syrup Thickening | 4 Day Compound Thickening | 7 Day Compound Thickening |
| 100% Polystyrene | 65,000 | 17.6 million | 23 million |
| 90/10 Styrene/Acrylonitrile | 87,000 | 25.2 million | 41 million |
| 75/25 Styrene/HEA | 140,000 | 28 million | 45 million |
| 90/10 Styrene/HEA | 75,000 | 25 million | 38 million |
| 90/10/2 Styrene/HEA/Acrylic acid | 90,000 | 40 million | 60 million |

In the above table the 20-minute viscosities of the resin syrups is determined by the Brookfield LVT viscosimeter, and the viscosity of the compound is determined by the Brookfield HBT viscosimeter.

The preferred thermoplastic additives for producing molding compounds are those having a low to medium molecular weight and a narrow range of molecular weights. Dispersity is a criterion of molecular weight distribution and this valve should be between 1.0 and 3.5, preferably between 1.0 and 2.6; and the molecular weight should be between 75,000 and 500,000, and preferably between 175,000 and 250,000. Any free radical catalyst can be used to initiate the polymerization of the thermoplastic materials and a partial list of the same is given in our previously filed application Ser. No. 457,948. The preferred thermoplastic additives are made by copolymerizing the polar monomer with the monomer which is used as a solvent for the thermosetting prepolymer, and the copolymerization is stopped when the solids level is from 20 to 50 percent. The reaction is preferably stopped with an inhibitor which stays with the thermoplastic and is added therewith to the thermosetting prepolymer. Polystyrene base thermoplastic additives are the most preferred materials, so that the preferred materials of the present invention are polystyrene copolymers and terpolymers that are made by the bulk polymerization of styrene with polar monomers of the type previously set forth.

While the invention has been described in considerable detail, we do not wish to be limited to the particular embodiments shown and described, and it is our intention to cover hereby all novel adaptations, modifications, and arrangements thereof which come within the practice of those skilled in the art and which are covered by the appended claims.

We claim:

1. A molding composition comprising:
    a. an $\alpha,\beta$-ethylenically unsaturated polymerizable polyester resin;
    b. styrene;
    c. a thermoplastic resin comprising a copolymer of a nonpolar, olefinically unsaturated monomer and an olefinically unsaturated monomeric reactant containing polar reactant portions and selected from the group consisting of hydroxyethyl acrylate, hydroxypropyl acrylate, unsaturated amines, unsaturated lactams, unsaturated alcohols and unsaturated diesters of phosphorus acid.

2. The molding composition of claim 1 in which said thermoplastic resin has a molecular weight within the range of from 75,000 and 500,000 and a dispersity within the range of from 1.0 to 3.5.

3. The molding composition of claim 1 wherein the polar reactant portion is an unsaturated amine.

4. The molding composition of claim 1 wherein the polar reactant portion is an unsaturated alcohol.

5. The molding composition of claim 1 wherein the polar reactant portion is an unsaturated diester of phosphorus acid.

6. The molding composition of claim 1 in which said monomer is styrene and said polyester resin comprises propylene maleate.

7. A molded article comprising the molding composition of claim 1.

* * * * *